US011935468B2

(12) United States Patent
Yang et al.

(10) Patent No.: US 11,935,468 B2
(45) Date of Patent: Mar. 19, 2024

(54) DISPLAY SUBSTRATE INCLUDING DRIVING CIRCUITS HAVING VOLTAGE DIVISION CONTROL SIGNAL TERMINAL

(71) Applicant: BOE Technology Group Co., Ltd., Beijing (CN)

(72) Inventors: Shengji Yang, Beijing (CN); Xue Dong, Beijing (CN); Xiaochuan Chen, Beijing (CN); Hui Wang, Beijing (CN); Pengcheng Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 74 days.

(21) Appl. No.: 17/537,154

(22) Filed: Nov. 29, 2021

(65) Prior Publication Data

US 2022/0084465 A1 Mar. 17, 2022

Related U.S. Application Data

(63) Continuation of application No. 16/617,060, filed as application No. PCT/CN2019/074972 on Feb. 13, 2019, now Pat. No. 11,205,379.

(30) Foreign Application Priority Data

May 9, 2018 (CN) ......................... 201810437743.3

(51) Int. Cl.

| | |
|---|---|
| ***G09G 3/3233*** | (2016.01) |
| ***G09G 3/3266*** | (2016.01) |
| ***G09G 3/3275*** | (2016.01) |

(52) U.S. Cl.
CPC ......... *G09G 3/3233* (2013.01); *G09G 3/3266* (2013.01); *G09G 3/3275* (2013.01); *G09G 2320/066* (2013.01); *G09G 2320/0686* (2013.01)

(58) Field of Classification Search
CPC .. G09G 3/3233; G09G 3/3266; G09G 3/3275; G09G 2320/0633; G09G 2300/0838; G09G 2300/0842; G09G 2300/0861; G09G 2300/0819; G09G 2320/0686; G09G 2320/066; G09G 2300/0885
See application file for complete search history.

(56) References Cited

U.S. PATENT DOCUMENTS

2014/0146026 A1* 5/2014 Yu ........................ G09G 3/3677 345/208

* cited by examiner

*Primary Examiner* — Yaron Cohen
(74) *Attorney, Agent, or Firm* — Lippes Mathias LLP

(57) ABSTRACT

A display substrate and a display device are provided. The display substrate includes a plurality of driving circuits, wherein each of the driving circuits includes: a first sub-circuit, respectively coupled to a gate signal terminal, a data signal terminal and a light-emitting power source terminal, and configured to store a drive voltage based on a voltage at the data signal terminal when the gate signal terminal receives a gate drive signal, and output a drive current to a light-emitting device based on the stored drive voltage under power supply provided by the light-emitting power source terminal; and a second sub-circuit, configured to regulate an equivalent resistance value of the second sub-circuit in an output path through which the drive current is output to the light-emitting device, based on a voltage division control signal received by the voltage division control signal terminal.

20 Claims, 9 Drawing Sheets

DISPLAY SUBSTRATE INCLUDING DRIVING CIRCUITS HAVING VOLTAGE DIVISION CONTROL SIGNAL TERMINAL

This application is a continuation of U.S. application Ser. No. 16/617,060, filed on Nov. 26, 2019, which is a 371 of PCT application No. PCT/CN2019/074972 filed on Feb. 13, 2019, which claims priority to Chinese Patent Application No. 201810437743.3, filed on May 9, 2018 and entitled “PIXEL CIRCUIT AND DRIVE METHOD THEREOF, DISPLAY SUBSTRATE, DISPLAY DEVICE”, the entire contents of all of which are incorporated herein by reference.

TECHNICAL FIELD

The present disclosure relates to the field of display, and particularly to a pixel circuit and a drive method thereof, a display substrate and a display device.

BACKGROUND

Organic light-emitting diode (OLED) displays are display products fabricated by using organic electroluminescent diodes, and have become a type of mainstream display products because of high luminance, color diversity, low drive voltage, quick response, low power consumption and the like merits. An OLED display is a full solid state device, which has a good anti-seismic performance, and a wide operation temperature range, and thus is applicable to military and special applications. The OLED display is also a self-luminescent device, which does not need a backlight source, and has a wide view angle range and a small thickness. Therefore, the OLED display may reduce the volume of the system and is applicable to a near-eye display system.

SUMMARY

The present disclosure provides a pixel circuit and a drive method thereof, a display substrate and a display device.

In an aspect, there is provided a pixel circuit, comprising a gate signal terminal, a data signal terminal, a switch signal terminal and a voltage division control signal terminal, the pixel circuit further comprising:

a current source sub-circuit, connected to the gate signal terminal, the data signal terminal and the switch signal terminal respectively, and configured to store a drive voltage based on a voltage at the data signal terminal when the gate signal terminal receives a gate drive signal, and output a drive current to a light-emitting device based on the stored drive voltage when the switch signal terminal receives a light-emitting control signal, a current value of the drive current being positively correlated to a voltage value of the drive voltage; and a voltage divider sub-circuit, connected to the voltage division control signal terminal and the current source sub-circuit respectively, and configured to regulate an equivalent resistance value of the voltage divider sub-circuit in an output path through which the drive current is output to the light-emitting device, based on a voltage division control signal received by the voltage division control signal terminal.

In a possible implementation, the voltage divider sub-circuit is configured to regulate the equivalent resistance value such that the equivalent resistance value is negatively correlated to the drive voltage stored by the current source sub-circuit.

In a possible implementation, the pixel circuit further comprises a light-emitting power source terminal and a current output terminal; wherein the light-emitting power source terminal is configured to supply power for the current source sub-circuit, and the current output terminal is configured to output a drive current to the light-emitting device; and the current source sub-circuit and the voltage divider sub-circuit are connected in series between the light-emitting power source terminal and the current output terminal.

In a possible implementation, the light-emitting power source terminal is connected to the current source sub-circuit, and the current output terminal is connected to the voltage divider sub-circuit.

In a possible implementation, the voltage divider sub-circuit comprises a first transistor; wherein a gate of the first transistor is connected to the voltage division control signal terminal, and a source and a drain of the first transistor are each connected to one of the current source sub-circuit and the current output terminal.

In a possible implementation, the light-emitting power source terminal is connected to the voltage divider sub-circuit, and the current output terminal is connected to the current source sub-circuit.

In a possible implementation, the voltage divider sub-circuit comprises a first transistor; wherein a gate of the first transistor is connected to the voltage division control signal terminal, and a source and a drain of the first transistor are each connected to one of the current source sub-circuit and the light-emitting power source terminal.

In a possible implementation, the current source sub-circuit comprises: a data write secondary circuit, a storage secondary circuit, a drive secondary circuit and a switch control secondary circuit; wherein the data write secondary circuit is connected to the storage secondary circuit, the drive secondary circuit, the gate signal terminal and the data signal terminal respectively, and is configured to write a drive voltage to the storage secondary circuit based on the voltage at the data signal terminal when the gate signal terminal receives the gate drive signal;

the storage secondary circuit is further connected to the drive secondary circuit, and is configured to store the drive voltage, and supply the drive voltage for the drive secondary circuit;

the drive secondary circuit is configured to output a drive current to the light-emitting device based on a drive voltage supplied by the storage secondary circuit, wherein the current value of the drive current is positively correlated to the voltage value of the drive voltage; and the switch control secondary circuit is connected to the drive secondary circuit and the switch signal terminal respectively, and is configured to turn on the output path of the drive current when the switch signal terminal receives a light-emitting control signal.

In a possible implementation, the gate signal terminal comprises a first terminal and a second terminal, and the data write secondary circuit comprises a first N-type transistor and a first P-type transistor; wherein a gate of the first N-type transistor is connected to the first terminal, and a source and a drain of the first N-type transistor are each connected to one of the data signal terminal and the storage secondary circuit; and a gate of the first P-type transistor is connected to the second terminal, and a source and a drain of the first P-type transistor are each connected to one of the data signal terminal and the storage secondary circuit.

In a possible implementation, the drive secondary circuit comprises a drive transistor, the storage secondary circuit comprises a first capacitor, and the switch control secondary circuit comprises a second transistor;

wherein a gate of the drive transistor is connected to the data write secondary circuit and the storage secondary circuit, and a drain and a source of the drive transistor are each connected to one of the switch control secondary circuit and the current output terminal;

a first terminal of the first capacitor is connected to the data write secondary circuit and the drive secondary circuit, and a second terminal of the first capacitor is connected to a common voltage line; and a gate of the second transistor is connected to the switch signal terminal, and a source and a drain of the second transistor are each connected to one of the light-emitting power source terminal and the drive secondary circuit.

In a possible implementation, the pixel circuit further comprises an initialization sub-circuit, the initialization sub-circuit being connected to the current output terminal, and being configured to set a voltage at the current output terminal to an initialization voltage before the current source sub-circuit stores the drive voltage based on the voltage at the data signal terminal each time.

In a possible implementation, the pixel circuit further comprises an initialization signal terminal, and the initialization sub-circuit comprises a third transistor;

wherein a gate of the third transistor is connected to the initialization signal terminal, and a source and a drain of the third transistor are each connected to one of the current output terminal and a common voltage line.

In a possible implementation, the pixel circuit further comprises the light-emitting device, and the light-emitting device is an organic light-emitting diode;

wherein the organic light-emitting diode is configured to emit light by receiving the drive current output by the current source sub-circuit.

In another aspect, there is provided a drive method for a pixel circuit, wherein the pixel circuit is any of the pixel circuit described above. The drive method comprises:

at a light-emitting stage, providing a light-emitting control signal for the switch signal terminal, and providing a voltage division control signal for the voltage division control signal terminal, such that the voltage divider sub-circuit in the pixel circuit regulates regulate an equivalent resistance value of the voltage divider sub-circuit in an output path through which a drive current is output to a light-emitting device.

In a possible implementation, the equivalent resistance value of the voltage divider sub-circuit is negatively correlated to a drive voltage stored by a current source sub-circuit in the pixel circuit.

In a possible implementation, prior to the light-emitting stage, the method further comprises:

at a data write stage, providing a gate drive signal for the gate signal terminal to stop providing the light-emitting control signal and the voltage division control signal, such that current source sub-circuit in the pixel circuit stores the drive voltage based on the voltage at the data signal terminal.

In a possible implementation, the pixel circuit further comprises an initialization sub-circuit. The initialization sub-circuit is connected to an initialization signal terminal, a current output terminal and a common voltage line. Prior to the data write stage, the method further comprises:

In initialization stage, providing an initialization signal for the initialization signal terminal, such that the initialization sub-circuit sets the voltage at the current output terminal to an initialization voltage based on a common voltage on the common voltage line.

In yet another aspect, there is provided a display substrate, comprising a plurality of pixel circuits described above.

In a possible implementation, the display substrate further comprises a voltage division control circuit connected to each of the pixel circuits via a plurality of control lines; wherein each of the control lines connects the voltage division terminal of one of the pixel circuits to the voltage division control circuit; or the display substrate comprises a plurality of display units, each of the display units comprising a plurality of pixel circuits, wherein each of the control lines connects voltage division control terminals of all the pixel circuits in a display unit to the voltage division control circuit.

In a possible implementation, the plurality of pixel circuits are arranged in a plurality of rows and columns, and the display substrate further comprises a gate drive circuit and a data drive circuit; wherein the gate drive circuit is connected to each of the plurality of pixel circuits via a plurality of gate lines, each of the plurality of gate lines connecting gate signal terminals of a row of pixel circuits to the gate drive circuit; and the data drive circuit is connected to each of the plurality of pixel circuits via a plurality of data lines, each of the plurality of data lines connecting data signal terminals of a column of pixel circuits to the data drive circuit.

In still yet another aspect, there is provided a display device, comprising any of the display substrates described above.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and reasonable variations of these drawings are also included in the protection scope of the present disclosure.

DETAILED DESCRIPTION

To make the principles and advantages of the present disclosure clearer, the embodiments of the present disclosure will be described below in detail in conjunction with the accompanying drawings. It is obvious that the described embodiments are part rather than all of the embodiments of the present disclosure. All other embodiments obtained by those of ordinary skill in the art based on the embodiments of the present disclosure without creative work are within the scope of protection of the present disclosure. Unless otherwise defined, technical terms or scientific terms used in the present disclosure shall be of ordinary meaning as understood by those of ordinary skill in the art to which the present disclosure pertains. The term “first” or “second” or a similar term used in the present disclosure does not denote any order, quantity, or importance, but is merely used to distinguish different components. The term “comprising” or a similar term means that elements or items which appear before the term include the elements or items listed after the term and their equivalents, and do not exclude other elements or items. The term “connection” or “connected to” or a similar term is not limited to a physical or mechanical connection but may include an electrical connection that is direct or indirect.

In the related art, a display substrate of an OLED display is provided with a plurality of pixels. Each pixel includes a light-emitting device and a thin-film transistor connected to the light-emitting device. The thin-film transistor is capable of driving the light-emitting device to emit light.

In some application scenarios, such as a near-eye display system and the like, the size and specifications of the thin-film transistor in the OLED display are restricted. For example, in some low-voltage processes, a voltage difference between two electrodes of the thin-film transistor should not exceed 6 V, such that a maximum value and a minimum value of a voltage across the light-emitting device is also correspondingly restricted. Thus, the OLED display achieves a low contrast, and high-contrast display may not be implemented.

Figure 1:
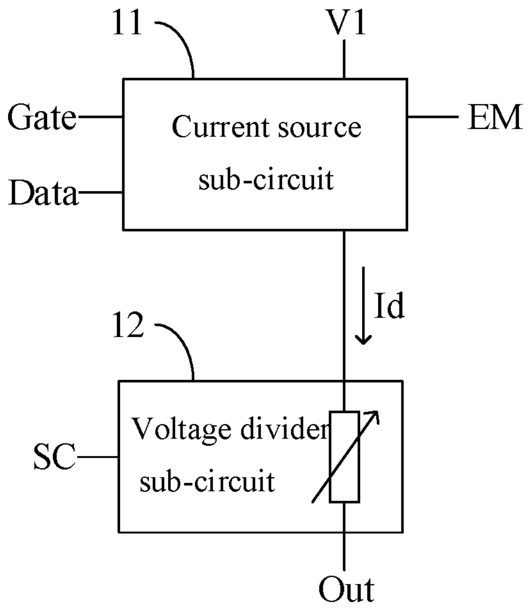
FIG. 1 is a structural block diagram of a pixel circuit according to an embodiment of the present disclosure.

FIG. 1 is a structural block diagram of a pixel circuit according to an embodiment of the present disclosure. Referring to FIG. 1, the pixel circuit includes a gate signal terminal Gate, a data signal terminal Data, a switch signal terminal EM and a voltage division control signal terminal SC, and further includes a current source sub-circuit 11 and a voltage divider sub-circuit 12.

The current source sub-circuit 11 is connected to the gate signal terminal Gate, the data signal terminal Data and the switch signal terminal EM respectively, and configured to store a drive voltage based on a voltage at the data signal terminal Data when the gate signal terminal Gate receives a gate drive signal, and output a drive current Id to a light-emitting device based on the stored drive voltage when the switch signal terminal EM receives a light-emitting control signal. A current value of the drive current Id is positively correlated to a voltage value of the drive voltage stored by the current source sub-circuit 11. The drive current Id is used for driving the light-emitting device to emit light, and thus may be referred to as a light-emitting current.

The voltage divider sub-circuit 12 is connected to the voltage division control signal terminal SC and the current source sub-circuit 11 respectively. The voltage divider sub-circuit 12 is configured to regulate an equivalent resistance value of the voltage divider sub-circuit 12 in an output path through which the drive current is output to the light-emitting device, based on a voltage division control signal received by the voltage division control signal terminal SC. FIG. 1 exemplarily illustrates, via a symbol of a variable resistor, the feature that the voltage divider sub-circuit 12 may regulate the equivalent resistance value of the voltage divider sub-circuit 12 in an output path of the drive current Id. It should be understood that this feature is not necessarily practiced by a variable resistor, and any circuit structure that may be controlled to change the value of the voltage division may be used to practice the above feature of the voltage divider sub-circuit 12, for example, a photosensitive resistor, a potentiometer, a memristor, a transistor or a circuit including at least one of the above devices.

In summary, in the technical solution according to the embodiment of the present disclosure, the voltage divider sub-circuit may have different equivalent resistance values between different pixel circuits, such that while it is ensured that the luminance of a light-emitting device in a brighter pixel in the display remains unchanged, the voltage loaded on a light-emitting device in a darker pixel in the display is lowered by voltage division of the voltage divider sub-circuit, such that the luminance of the light-emitting device in the darker pixel is lowered. In this way, the picture contrast in the display may be effectively improved, and high-contrast display of the display may be practiced.

As illustrated in FIG. 1, the pixel circuit according to the embodiment of the present disclosure may further include a light-emitting power source terminal V1 and a current output terminal Out. The light-emitting power source terminal V1 is configured to supply power for the current source sub-circuit 11, and the current output terminal Out may be connected to the light-emitting device and configured to output a drive current to the light-emitting device. Exemplarily, the light-emitting power source terminal V1 may be a power source positive terminal Vdd.

The current source sub-circuit 11 and the voltage divider sub-circuit 12 may be connected in series between the light-emitting power source terminal V1 and the current output terminal Out. The current source sub-circuit 11 is configured to output the drive current Id to the current output terminal Out under power supply by the light-emitting power source terminal V1.

In an optional implementation, as illustrated in FIG. 1, the light-emitting power source terminal V1 may be directly connected to the current source sub-circuit 11, and the current output terminal Out may be directly connected to the voltage divider sub-circuit 12. That is, the voltage divider sub-circuit 12 may be arranged between the current source sub-circuit 11 and the current output terminal Out.

In an example as illustrated in FIG. 1, the output path of the drive current Id starts from the power source positive terminal Vdd, passes through the current source sub-circuit 11 and the voltage divider sub-circuit 12 in sequence, and reaches the current output terminal Out of the pixel circuit. The current value of the drive current Id is mainly controlled by the current source sub-circuit 11 based on the voltage value of the drive voltage stored therein. The voltage divider sub-circuit 12 may share a portion of the voltage in the output path of the drive current Id (the shared voltage value may be, for example, equal to a product of the current value of the drive current Id and the equivalent resistance value). It can be known that relative to the case where no voltage divider sub-circuit 12 is arranged, the voltage value at the current output terminal Out may be reduced to some extent under the voltage division effect of the voltage divider sub-circuit 12. The reduction amplitude may be controlled by regulating the equivalent resistance value of the voltage divider sub-circuit 12 through the voltage division control signal at the voltage division control signal terminal SC.

In an example, the above drive method for a pixel circuit may include: providing a voltage division control signal for the voltage division control signal terminal SC while providing a light-emitting control signal for the switch signal terminal EM, such that an equivalent resistance value of the voltage divider sub-circuit 12 is negatively correlated to a drive voltage stored by the current source sub-circuit 11.

For example, the current output terminal Out of the pixel circuit may be connected to a positive electrode of a light-emitting device, to supply the drive current Id for the light-emitting device, and a negative electrode of the light-emitting device is connected to a power source negative terminal Vss. In this way, the higher the voltage at the current output terminal Out, the greater the luminance of the light-emitting device (the greater the current value of the drive current Id, the greater the luminance of the light-emitting device).

According to the above drive method, with respect to a dark-state pixel having a low drive voltage and a small drive current Id, the equivalent resistance value of the voltage divider sub-circuit 12 may have a great value under the effect of the voltage division control signal, such that the voltage value at the current output terminal Out has a great reduction amplitude. Therefore, the luminance of the light-emitting device may be lowered, that is, the dark-state pixel may become darker. According to the above drive method, with respect to a bright-state pixel having a high drive voltage and a great drive current Id, the equivalent resistance value of the voltage divider sub-circuit 12 may have a small value under the effect of the voltage division control signal, such that the voltage value at the current output terminal Out has a small reduction amplitude. Therefore, the luminance of the light-emitting device may remain almost unchanged, that is, the luminance of the bright-state pixel may remain almost unchanged.

Where the dark-state pixel becomes darker, and the luminance of the bright-state pixel remains almost unchanged, the contrast of the display picture may be improved. Apparently, the pixel circuit may cooperate with the drive method to improve the picture contrast, such that the display achieves both a high luminance and a high contrast.

In an application scenario of an OLED display in, for example, a low-voltage process, in the pixel circuit which does not include the voltage divider sub-circuit 12, the voltage value at the current output terminal Out may only change within a small range. For example, the voltage value Vout at the current output terminal Out may only change within a range of 1 V to 5 V. By cooperation between the pixel circuit and the drive method thereof, exemplarily, the voltage divider sub-circuit 12 may shoulder a 2 V voltage when Vout=1 V, and shoulder a 0.3 V voltage when Vout=5 V, such that a change range of Vout may be extended from the range of 1 V to 5 V to the range of 1 V to 4.7 V. In this way, the OLED display achieves a large bright-dark change range during display. It can be known that the pixel circuit may cooperate with the drive method to break through the restriction on the picture contrast of the OLED display in the low-voltage process.

Figure 2:
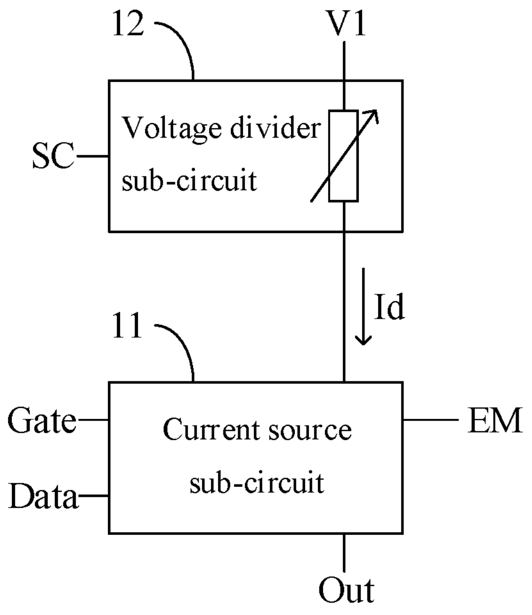
FIG. 2 is a structural block diagram of a pixel circuit according to another embodiment of the present disclosure.

FIG. 2 is a structural block diagram of a pixel circuit according to another embodiment of the present disclosure. As another optional implementation, as seen from a comparison between FIG. 1 and FIG. 2, relative to the pixel circuit as illustrated in FIG. 1, in the pixel circuit as illustrated in FIG. 2, positions of the current source sub-circuit 11 and the voltage divider sub-circuit 12 are exchanged. That is, the light-emitting power source terminal V1 is directly connected to the voltage divider sub-circuit 12, and the current output terminal Out is directly connected to the current source sub-circuit 11. That is, the voltage divider sub-circuit 12 is arranged between the light-emitting power source terminal V1 and the current source sub-circuit 11.

It may be understood that since the current source sub-circuit 11 in the output path of the drive current Id is connected in series to the voltage divider sub-circuit 12, the exchange of the positions may not change the impact caused by the voltage divider sub-circuit 12 on the voltage at the current output terminal Out. The voltage divider sub-circuit 12 may still have different equivalent resistance values between different pixel circuits, such that a terminal voltage of the light-emitting device in the darker pixel is reduced by voltage division while a maximum picture luminance is maintained unchanged. In this way, the picture contrast may break through the restriction of the low-voltage process, and high-contrast display of the OLED display is facilitated.

In the embodiment of the present disclosure, the light-emitting power source terminal V1 may be a power source positive terminal Vdd, and the pixel circuit is configured to supply a drive current for the light-emitting device from the positive electrode of the light-emitting device. Alternatively, the light-emitting power source terminal V1 may also be a power source negative terminal Vss, such that the pixel circuit may be configured to supply a drive current for the light-emitting device from a negative electrode of the light-emitting device (in this case, the positive electrode of the light-emitting device may be directly connected to the power source positive terminal Vdd, and the output path of the drive current Id starts from the power source positive terminal Vdd, passes through the light-emitting device and the pixel circuit in sequence, and finally reaches the power source negative terminal Vss).

Figure 3:
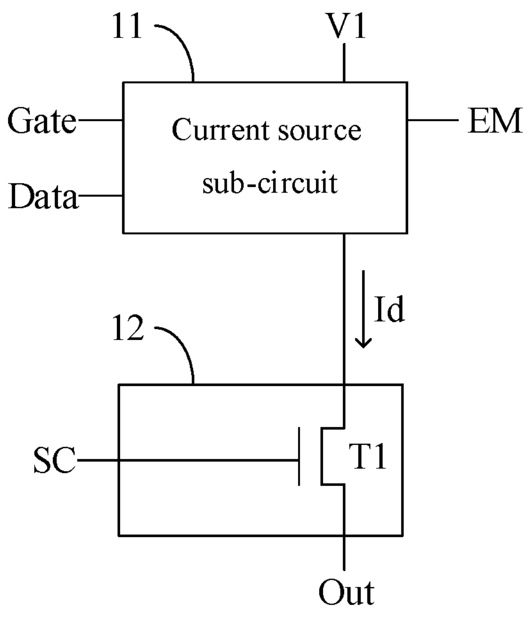
FIG. 3 is a structural block diagram of a pixel circuit according to still another embodiment of the present disclosure.

FIG. 3 is a circuit structural diagram of a pixel circuit according to an embodiment of the present disclosure. This embodiment exemplarily illustrates a structure example of the voltage divider sub-circuit 12. As illustrated in FIG. 3, the voltage divider sub-circuit 12 includes a first transistor T1, wherein a gate of the first transistor T1 is connected to the voltage division control signal terminal SC, a source and a drain of the first transistor T1 are each connected to a circuit node in the output path of the drive current Id.

Exemplarily, in the structure as illustrated in FIG. 3, one of the source and the drain of the first transistor T1 is connected to the current source sub-circuit 11, and the other of the source and the drain is connected to the current output terminal Out, such that the voltage division control signal at the voltage division control signal terminal SC may control an operation state of the first transistor T1. For example, an operation point of the first transistor T1 may be regulated in a linear region on a characteristic curve of the first transistor T1, to regulate the equivalent resistance value between the source and the drain of the first transistor T1, and thus implement the function of the voltage divider sub-circuit 12.

It should be understood that the source and the drain of the first transistor T1 may also be respectively connected to another node in the output path, to implement the function of the voltage divider sub-circuit 12. For example, according to the connection as illustrated in FIG. 2, the first transistor T1 may be connected between the light-emitting power source terminal V1 and the current source sub-circuit 11. That is, one of the source and the drain of the first transistor T1 is connected to the current source sub-circuit 11, and the other of the source and the drain is connected to the light-emitting power source terminal V1.

Exemplarily, the first transistor T1 may be an N-type transistor, and the voltage division control signal received by the voltage division control signal terminal SC may be a signal at a high level. Alternatively, the first transistor T1 may also be a P-type transistor, and the voltage division control signal received by the voltage division control signal terminal SC may be a signal at a low level. For example, when the first transistor T1 is a P-type transistor, the voltage division control signal terminal SC may be connected to a common voltage line Vcom or a power source negative terminal Vss.

It should be noted that the connection relationship between the source and the drain of the transistor may be defined based on the different types of the transistor to match the direction of the current flowing through the transistor; and when the transistor has a source-drain symmetric structure, the source and the drain may be considered as two electrodes that are not particularly differentiated.

Figure 4:
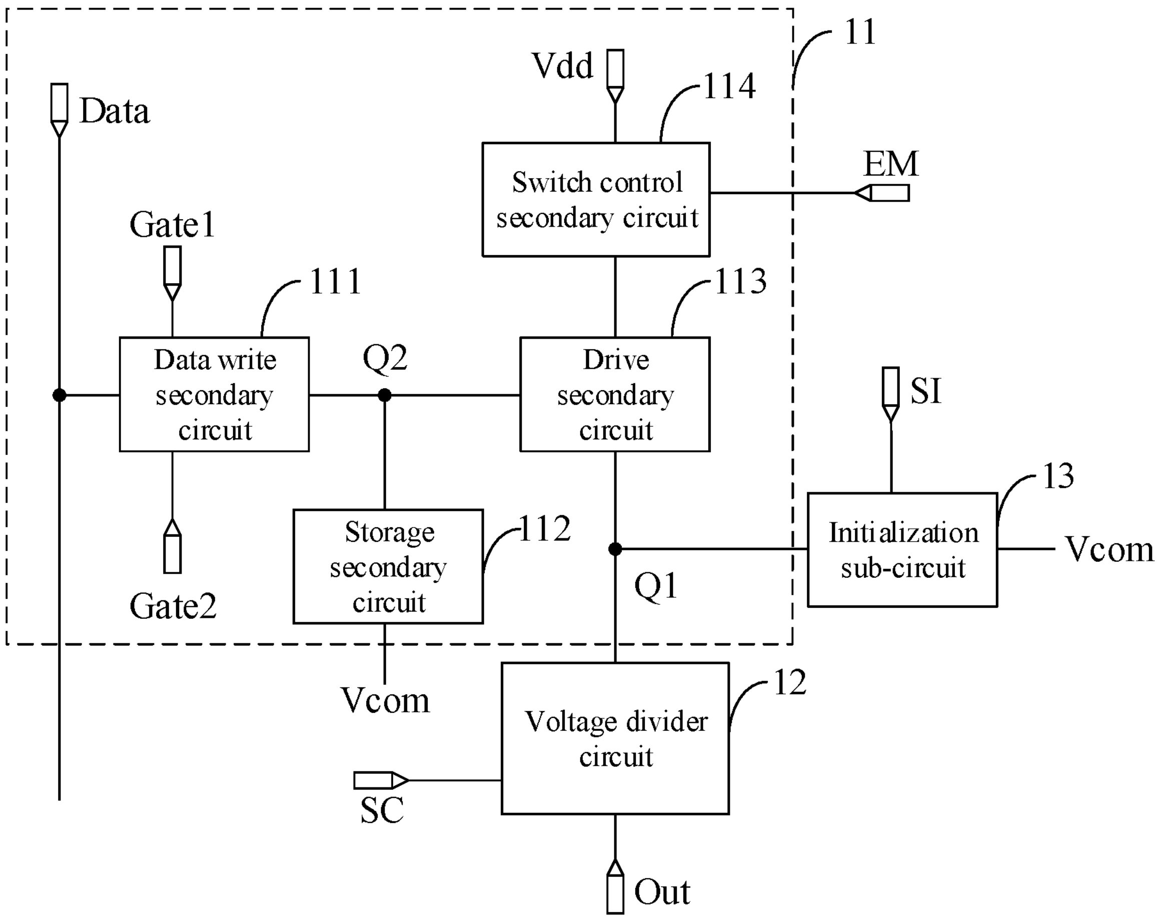
FIG. 4 is a structural block diagram of a pixel circuit according to yet still another embodiment of the present disclosure.

This embodiment exemplarily illustrates a structure example of the current source sub-circuit 11. As illustrated in FIG. 4, the current source sub-circuit 11 may include a data write secondary circuit 111, a storage secondary circuit 112, a drive secondary circuit 113 and a switch control secondary circuit 114. The pixel circuit as illustrated in FIG. 4 is described using the scenario where the light-emitting power source terminal V1 is the power source positive terminal Vdd as an example.

The data write secondary circuit 111 is connected to the storage secondary circuit 112, a control terminal of the drive secondary circuit 113, the gate signal terminal Gate and the data signal terminal Data respectively, and is configured to write the drive voltage to the storage secondary circuit 112 based on the voltage at the data signal terminal Data when the gate signal terminal Gate receives the gate drive signal.

The storage secondary circuit 112 is connected to a control terminal of the drive secondary circuit 113, and the storage secondary circuit 112 is configured to store the drive voltage, and supply the drive voltage to a control terminal of the drive secondary circuit 113. Referring to FIG. 4, the storage secondary circuit 112 may also be connected to a common voltage line Vcom.

The drive secondary circuit 113 is disposed in the output path of the drive current Id, and the drive secondary circuit 113 is configured to regulate a current value of the drive current Id output to the light-emitting device based on the voltage at the control terminal thereof (that is, the drive voltage), such that the current value of the drive current Id is positively correlated to the voltage value of the voltage at the control terminal.

Exemplarily, referring to FIG. 4, the control terminal of the drive secondary circuit 113 is connected to the storage secondary circuit 112. The drive secondary circuit 113 is further connected to the switch control secondary circuit 114 and the voltage divider sub-circuit 12 respectively, and the drive secondary circuit 113 may output the drive current Id to the light-emitting device via the voltage divider sub-circuit 12.

The switch control secondary circuit 114 is disposed in the output path of the drive current Id. The switch control secondary circuit 114 is connected to the switch signal terminal EM, and the switch control secondary circuit 114 is configured to turn on the output path of the drive current Id when the switch signal terminal EM receives the light-emitting control signal.

Exemplarily, referring to FIG. 4, the switch control secondary circuit 114 may further be connected to the power source positive terminal Vdd and the drive secondary circuit 113 respectively, and the switch control secondary circuit 114 may turn on the power source positive terminal Vdd and the drive secondary circuit 113 when the switch signal terminal EM receives the light-emitting control signal, such that the output path of the drive current Id is turned on.

Based on the above secondary circuits, the current source sub-circuit 11 may implement the above configurations: storing the drive voltage based on the voltage at the data signal terminal Data when the gate signal terminal Gate receives the gate drive signal, and outputting the drive current Id to the light-emitting device based on the stored drive voltage when the switch signal terminal EM receives the light-emitting control signal.

Figure 5:
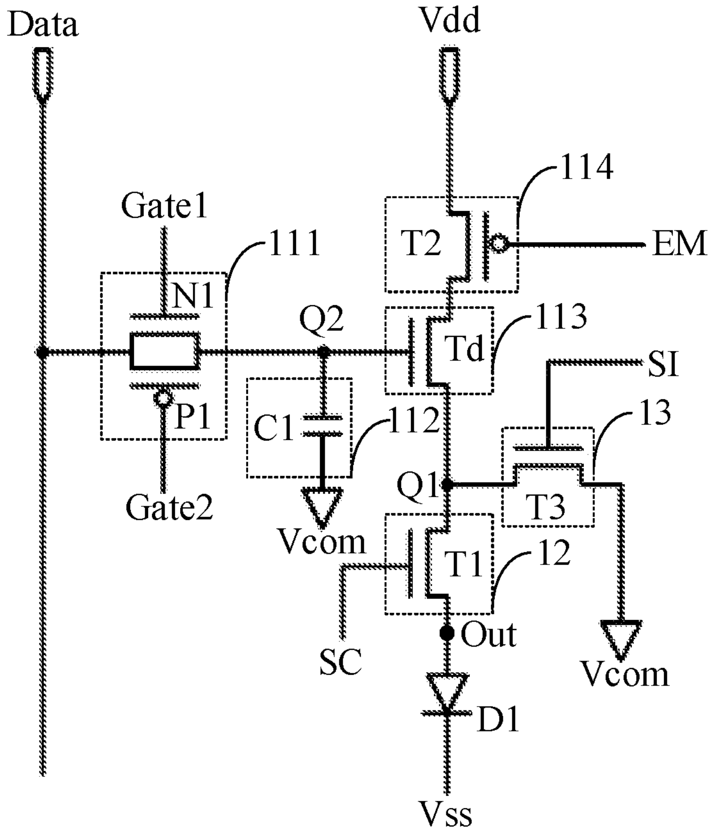
FIG. 5 is a circuit structural diagram of a pixel circuit according to an embodiment of the present disclosure.

FIG. 5 exemplarily illustrates implementations of the above secondary circuits. The pixel circuit as illustrated in FIG. 5 is described using the scenario where the light-emitting power source terminal V1 is the power source positive terminal Vdd as an example. Referring to FIG. 4 and FIG. 5, the pixel circuit in this embodiment includes the gate signal terminal Gate, the data signal terminal Data, the switch signal terminal EM, the voltage division control signal terminal SC, an initialization signal terminal SI, the power source positive terminal Vdd and the current output terminal Out, and further includes the current source sub-circuit 11, the voltage divider sub-circuit 12, an initialization sub-circuit 13 and a light-emitting device. The light-emitting device is an organic light-emitting diode D1.

Referring to FIG. 5, the switch control secondary circuit 114 includes a second transistor T2, wherein a gate of the second transistor T2 is connected to the switch signal terminal EM, and a source and a drain of the second transistor T2 are each connected to one of the power source positive terminal Vdd and the drive secondary circuit 113.

Exemplarily, the second transistor T2 may be a P-type transistor, and a time period when the switch signal terminal EM receives the light-emitting control signal is a time period when the switch signal terminal EM is at a low level. That is, the light-emitting control signal may be a signal at a low level. Within the time period when the switch signal terminal EM receives the light-emitting control signal, the second transistor T2 is turned on, such that the output path of the drive current Id is turned on. Outside this time period, the second transistor T2 is turned off, such that the output path of the drive current Id is turned off. In this way, the function of the switch control secondary circuit 114 is implemented.

Referring to FIG. 5, the drive secondary circuit 113 includes a drive transistor Td, wherein a gate of the drive transistor Td is connected to the data write secondary circuit 111 and the storage secondary circuit 112, and a source and a drain of the drive transistor Td are each connected to one of the switch control secondary circuit 114 and the current output terminal Out.

Exemplarily, in the structure as illustrated in FIG. 5, the gate of the drive transistor Td is connected to a node Q2, and the data write secondary circuit 111 and the storage secondary circuit 112 are also respectively to the node Q2. One of the source and the drain of the drive transistor Td is connected to the switch control secondary circuit 114, and the other of the source and the drain is connected to a node Q1, that is, the other of the source and the drain may be connected to the current output terminal Out via the voltage divider sub-circuit 12.

Referring to FIG. 5, the storage secondary circuit 112 includes a first capacitor C1, wherein a first terminal of the first capacitor C1 is connected to the data write secondary circuit 111 and the drive secondary circuit 113. For example, in the structure as illustrated in FIG. 5, the first terminal of the first capacitor C1 is connected to the node Q2. A second terminal of the first capacitor C1 is connected to the common voltage line Vcom.

Exemplarily, the drive transistor Td may be an N-type transistor, such that a drive voltage (that is, a gate voltage of the drive transistor Td) stored by the first capacitor C1 may control a current value of a source-drain current of the drive transistor Td. In addition, the higher the drive voltage, the greater the current value of the source-drain current of the drive transistor Td. In this way, the functions of the drive secondary circuit 113 and the storage secondary circuit 112 are implemented.

It should be noted that the value of the drive voltage may be an amplitude value f deviating from a reference voltage (the reference voltage may be a zero voltage), such that even if the drive secondary circuit 113 is practiced using a P-type transistor, the current value of the drive current Id may still be positively correlated to the voltage value of the voltage at the control terminal (that is, the gate of the drive transistor Td) of the drive secondary circuit 113.

Referring to FIG. 5, the above-described gate signal terminal Gate includes a first terminal Gate 1 and a second termination Gate 2. The first terminal Gate 1 and the second terminal Gate 2 are respectively loaded with a positive phase gate drive signal and negative phase gate drive signal. That is, when the gate drive signal loaded at the first terminal Gate 1 is at a high level, the gate drive signal loaded at the second terminal Gate 2 is at a low level. When the gate drive signal loaded at the first terminal Gate 1 is at a low level, the gate drive signal loaded at the second terminal Gate 2 is at a high level.

The data write secondary circuit 111 includes a first N-type transistor N1 and a first P-type transistor P1. A gate of the first N-type transistor N1 is connected to the first terminal Gate 1, and a source and a drain of the first N-type transistor N1 are each connected to one of the data signal terminal Data and the storage secondary circuit 112. A gate of the first P-type transistor P1 is connected to the second terminal Gate 2, and a source and a drain of the first P-type transistor P1 are each connected to one of the data signal terminal Data and the storage secondary circuit 112.

As such, the time period when the gate signal terminal Gate receives the gate drive signal is a time period when the first terminal Gate 1 is at a high level and the second terminal Gate 2 is at a low level. Within this time period, the first N-type transistor N1 and the first P-type transistor P1 are both turned on, such that the voltage at the data signal terminal Data may be written to the storage secondary circuit 112 in the current source sub-circuit 11. The storage secondary circuit 112 may store the drive voltage based on the voltage at the data signal terminal Data. Outside this time period, the first N-type transistor N1 and the first P-type transistor P1 are both turned off, such that the voltage at the data signal terminal Data and the drive voltage stored by the storage secondary circuit 112 do not affect each other. As such, the function of the data write secondary circuit 111 is implemented.

In addition, since the first N-type transistor N1 may be configured to write a high voltage at the data signal terminal Data to the storage secondary circuit 112, and the first P-type transistor P1 may be configured to write a low voltage at the data signal terminal Data to the storage secondary circuit 112, relative to the case where a single transistor is adopted, it facilitates extending a voltage range of the voltage written by the data write secondary circuit 111.

Optionally, the data write secondary circuit 11 may also include only one of the first N-type transistor N1 and the first P-type transistor P1. For example, the data write secondary circuit 11 may include only the first N-type transistor N1 or only the first P-type transistor P1.

This embodiment further exemplarily illustrates implementation of an initialization sub-circuit 13. The initialization sub-circuit 13 is configured to set the voltage at the current output terminal Out to an initialization voltage before the current source sub-circuit 11 stores the drive voltage based each time. In this way, mutual impacts between anterior and posterior frame data voltages (that is, voltage at the data signal terminal Data) may be reduced, and motion blur in high-frequency driving is improved.

Referring to FIG. 5, the initialization sub-circuit 13 includes a third transistor T3. A gate of the third transistor T3 is connected to the initialization signal terminal SI, and a source and a drain of the third transistor T3 are each connected to one of the current output terminal Out and the common voltage line Vcom. For example, in the structure as illustrated in FIG. 5, one of the source and the drain of the third transistor T3 is connected to the common voltage line Vcom, and the other of the source and the drain is connected to the node Q1. That is, the other of the source and the drain is connected to the current output terminal Out via the voltage divider circuit 12.

Exemplarily, the third transistor T3 may be an N-type transistor, and the initialization signal received by the initialization signal terminal SI may be a signal at a high level. A time period when the initialization signal terminal SI is at a high level (that is, a time period when the initialization signal terminal SI receives the initialization signal) may be set to be prior to the time period when each gate signal terminal Gate receives the gate drive signal. For example, the third transistor T3 may set the voltage at the node Q1 as a common voltage before the data write secondary circuit 111 writes the drive voltage to the storage secondary circuit 112 each time, such that the function of the initialization sub-circuit 13 is implemented.

Alternatively, in addition to adopting the common voltage supplied by the common voltage line Vcom, the initialization voltage may also adopt, for example, a gate low-level voltage (VGL) or a light-emitting source low voltage (ELVSS) or the like in a possible range, which may be configured according to the application needs.

In this embodiment, the pixel circuit may further include a light-emitting device. As illustrated in FIG. 5, the light-emitting device may be an organic light-emitting diode D1.

Exemplarily, one electrode of the organic light-emitting diode D1 is connected to the current source sub-circuit 11, to emit light by receiving the drive current Id output by the current source sub-circuit 11.

For example, referring to FIG. 5, one electrode of the organic light-emitting diode D1 is connected to the current output terminal Out, that is, connected to the current source sub-circuit 11 via the voltage divider sub-circuit 12. Alternatively, with respect to the connection as illustrated in FIG. 2, one electrode of the organic light-emitting diode D1 may be directly connected to the current source sub-circuit 11 via the current output terminal Out. The other electrode of the organic light-emitting diode D1 is connected to the power source negative terminal Vss.

It should be understood that the above pixel circuit may be a circuit structure dedicatedly supplying the drive current for the light-emitting device. That is, the pixel circuit may not include a light-emitting device. Alternatively, the pixel circuit may also be a circuit structure which includes a light-emitting device and is used as a sub-pixel or a pixel.

In addition, it can be known that the current output terminal Out in this embodiment is practically an internal node of the pixel circuit. Using this scenario as an example, the terminals of the pixel circuit may be one of an external node and an internal node, instead of all being a node connected to an external structure.

Figure 6:
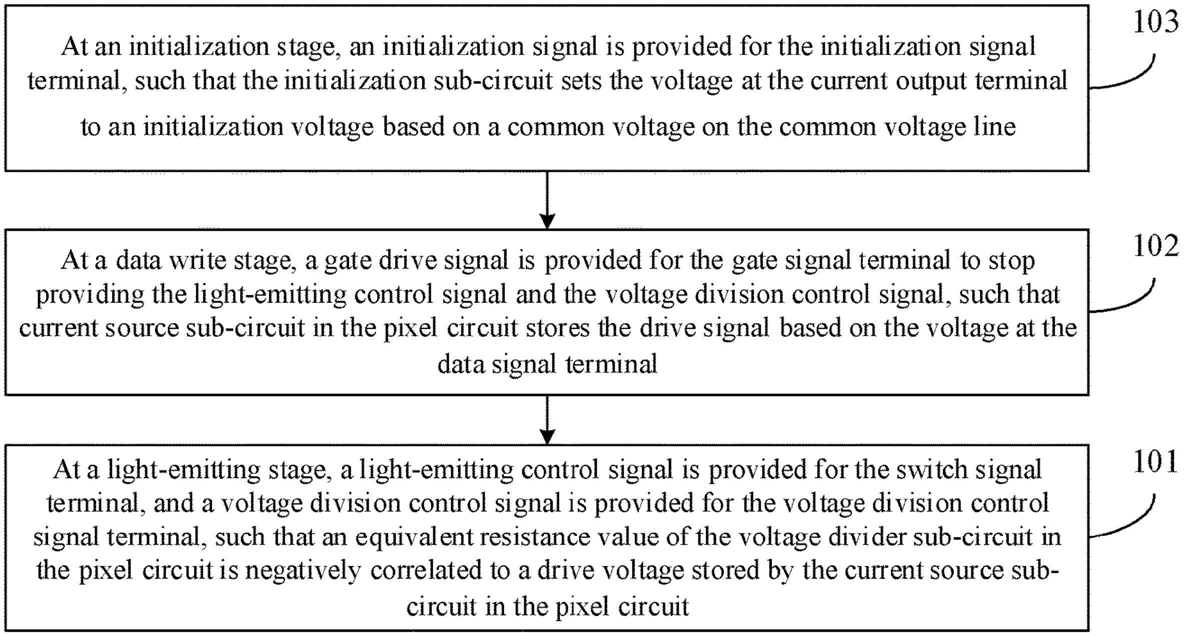
FIG. 6 is a flowchart of a drive method for a pixel circuit according to one embodiment of the present disclosure.

An embodiment of the present disclosure provides a drive method for a pixel circuit. The drive method may be used to drive the pixel circuit as described in the above embodiment. Referring to FIG. 6, the method may include the following steps.

In step 101, at a light-emitting stage, a light-emitting control signal is provided for the switch signal terminal, and a voltage division control signal is provided for the voltage division control signal terminal, such that an equivalent resistance value of the voltage divider sub-circuit in the pixel circuit is negatively correlated to a drive voltage stored by the current source sub-circuit in the pixel circuit.

Optionally, still referring to FIG. 6, prior to the light-emitting stage in step 101, the method may further include the following step.

In step 102, at a data write stage, a gate drive signal is provided for the gate signal terminal to stop providing the light-emitting control signal and the voltage division control signal, such that current source sub-circuit in the pixel circuit stores the drive signal based on the voltage at the data signal terminal.

Optionally, referring to FIG. 4 and FIG. 5, the pixel circuit may further include an initialization sub-circuit 13. The initialization sub-circuit 13 is connected to the initialization signal terminal SI, the current output terminal Out and the common voltage line Vcom respectively. Correspondingly, prior to the data write stage in step 102, the method may further include the following step.

In step 103, at an initialization stage, an initialization signal is provided for the initialization signal terminal, such that the initialization sub-circuit sets the voltage at the current output terminal to an initialization voltage based on a common voltage on the common voltage line.

Figure 7:
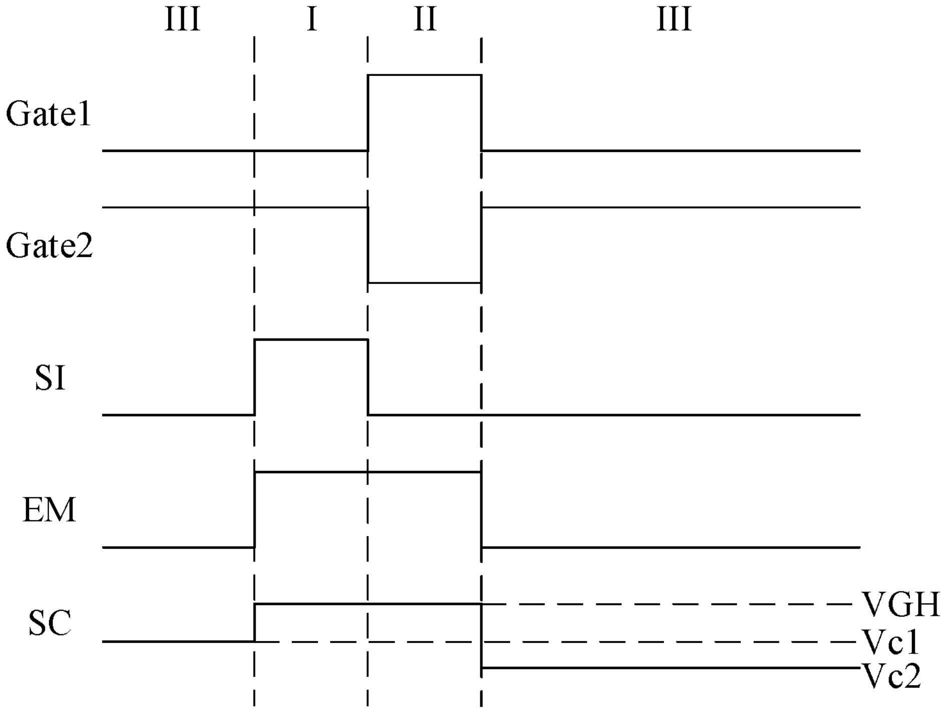
FIG. 7 is a circuit timing sequence diagram of a pixel circuit according to one embodiment of the present disclosure.

FIG. 7 is a circuit time sequence diagram of a pixel circuit according to an embodiment of the present disclosure. Using the pixel circuit as illustrated in FIG. 5 as an example, the drive method for the pixel circuit is described. Referring to FIG. 7, for the pixel circuit, an initialization stage I, a data write stage II and a light-emitting stage III may be included within each operation cycle. In accordance with a sequence, the pixel circuit operates as follows in each operation cycle:

At the initialization stage I, an initialization signal at a high level is provided for the initialization signal terminal S1, and a voltage division control signal is provided for the voltage division control signal terminal SC, and providing a gate drive signal for the gate signal terminal Gate is stopped, and providing a light-emitting control signal for the switch signal terminal EM is stopped. In this case, the second terminal Gate 2, the switch signal terminal EM, the initialization signal terminal SI and the voltage division control signal terminal SC are all at a high level, and the first terminal Gate 1 is at a low level, such that the first transistor T1 and the third transistor T3 are turned on, and the first N-type transistor N1, the first P-type transistor P1 and the second transistor T2 are turned off. In this case, the common voltage on the common voltage line Vcom may be written to the node Q1, and the positive electrode of the organic light-emitting diode D1 is set to the common voltage via the first transistor T1, such that initialization of the pixel circuit is implemented.

Within the initialization stage I, the voltage at the node Q2 may be maintained to be the drive voltage pre-stored by the first capacitor C1, such that the drive transistor Td may be turned on. However, since the second transistor T2 is turned off such that the output path of the drive current is turned off, it is probable that no current flows through the organic light-emitting diode D1, such that the organic light-emitting diode D1 may in a non-light-emitting state, for example, in a reversely biased state.

At the data write stage II, the gate drive signal is provided for the gate signal terminal Gate, the voltage division control signal is provided for the voltage division control signal terminal SC, providing the light-emitting control signal for the switch signal terminal EM is stopped, and providing the initialization signal for the initialization signal terminal SI is stopped. In this case, the first terminal Gate 1, the switch signal terminal EM and the voltage division control signal terminal SC are all at a high level, and the second terminal Gate 2 and the initialization signal terminal SI are both at a low level, such that the first N-type transistor N1, the first P-type transistor P1 and the first transistor T1 are turned on, and the second transistor T2 and the third transistor T3 are turned off. In this case, under the effect of the voltage at the data signal terminal Data, the first capacitor C1 may be charged or discharged, until the voltage at the node Q2 is approximately equal to the voltage at the data signal terminal Data, such that the drive voltage at the node Q2 is updated. It may be predicted that after the first N-type transistor N1 and the first P-type transistor P1 are turned off afterwards, the first capacitor C1 may cause the voltage at the node Q2 to remain unchanged, such that the drive voltage is stored. Within the data write stage, the second transistor T2 is still turned off, such that the output path of the drive current is turned off. Therefore, the organic light-emitting diode D1 with no drive current being provided is still in the non-light-emitting state.

Exemplarily, as illustrated in FIG. 7, at the initialization state and the data write stage, the voltage of the voltage division control signal provided for the voltage division control signal terminal SC may be a gate high-level voltage (VGH).

At the light-emitting stage III, the light-emitting control signal is provided for the switch signal terminal EM, the voltage division control signal is provided for the voltage division control signal terminal SC, providing the initialization signal for the initialization signal terminal SI is stopped, and providing the gate drive signal for the gate signal terminal Gate is stopped. In this case, the second terminal Gate 2 is at a high level, the first terminal Gate 1, the switch signal terminal EM and the initialization signal terminal SI are all at a low level, and the voltage of the voltage division control signal received by the voltage division control signal terminal SC changes to be a control voltage Vc2. Referring to FIG. 7, the control voltage Vc2 may be lower than the VGH. In this way, the first N-type transistor N1, the first P-type transistor P1 and the third transistor T3 are all turned off, and the first transistor T1, the second transistor T2 and the drive transistor Td are all turned on, such that the output path of the drive current is turned on.

Assuming that, in this case, the voltage at the node Q2 is Vdata and a threshold voltage of the drive transistor Td is Vth, then in an ideal condition, in accordance with the source following principle, the voltage at the node Q1 approaches Vdata-Vth, and the first transistor T1 may have a specific equivalent source-drain resistance under the effect of the control voltage Vc2 of the gate, such that a positive electrode voltage (that is, the voltage at the current output terminal Out) of the organic light-emitting diode D1 reduces to Vdata-Vth-Vp. Vp is a voltage value shouldered by the equivalent source-drain resistance of the first transistor T1 in the output path of the drive current.

Since the equivalent source-drain resistance of the first transistor T1 may decrease with the increase of the gate voltage within a specific range, a corresponding relationship between the control voltage Vc2 and Vp under a specific Vdata condition may be pre-obtained by, for example, an experimental measurement method. Based on the corresponding relationship, a desired Vp may be obtained by regulating the voltage value of the control voltage Vc2. For example, a value range of Vdata may be subject to restrictions of the voltage-resistance property of the thin-film transistor in the low-voltage process for example. Where Vdata-Vth is equal to a maximum value 5 V, the first transistor T1 may be made to have a small equivalent source-drain resistance by regulating the control voltage Vc2, such that practically Vp=0.3 V. However, where Vdata-Vth is equal to a minimum value 1 V, the first transistor T1 may be made to have a great equivalent source-drain resistance by regulating the control voltage Vc2, such that practically Vp=2 V. As such, the pixels displayed dark may become darker, and the luminance of the pixels displayed bright remains almost unchanged, such that the picture contrast is improved.

It may be understood that if the first transistor T1 in the output path of the drive current is removed, the positive electrode voltage of the organic light-emitting diode D1 can only change within a range of 1 V to 5 V, such that the picture contrast is correspondingly restricted.

It can be known that the voltage divider sub-circuit 12 in the embodiment of the present disclosure may still have different equivalent resistance values between different pixel circuits, such that a terminal voltage of the light-emitting device in the darker pixel is reduced by voltage division while a maximum picture luminance is maintained unchanged. In this way, the picture contrast may break through the restriction of the low-voltage process, and high-contrast display of the OLED display is facilitated.

It should be understood that with respect to the light-emitting stage III within each operation cycle of each pixel circuit, a different voltage of the voltage division control signal may be set based on the voltage at the data signal terminal Data. For example, the voltages of the voltage division control signal at the light-emitting stages III within the two operation cycles in FIG. 7 are respectively Vc1 and Vc2. In this way, the effect of improving the picture contrast is implemented.

Optionally, referring to FIG. 5, it can be known that the positive electrode of the organic light-emitting diode D1 is connected to the current output terminal Out, and the negative electrode of the organic light-emitting diode D1 is connected to the power source negative terminal Vss. Based on the above analysis, it can be known that in the embodiment of the present disclosure, the positive electrode voltage of the organic light-emitting diode D1 is Vdata-Vth-Vp, and therefore, a cross voltage between two electrodes is Vdata-Vth-Vp-Vss. If the first transistor T1 in the pixel circuit is removed, the cross voltage between two electrodes of the organic light-emitting diode D1 is Vdata-Vth-Vss. Generally, the greater a change range of the cross voltage between two electrodes of the organic light-emitting diode D1, the higher the contrast of the OLED display. The greater the cross voltage between two electrodes of the organic light-emitting diode D1, the higher the luminance of the OLED display. As seen from the formula of the cross voltage between two electrodes of the organic light-emitting diode D1, when a change range of the voltage Vdata at the data signal terminal Data remains unchanged, the cross voltage between two electrodes of the organic light-emitting diode D1 and the change range of the cross voltage are correlated to the value of Vss.

In the embodiment of the present disclosure, for an improvement of flexibility of the OLED display, the OLED display may be further provided with a light intensity sensor. The light intensity sensor may detect a light intensity of an ambient environment of the display device. In the OLED display, the drive circuit (for example, the timing sequence controller) configured to control the pixel circuit may regulate the voltage at the power source negative terminal Vss based on the light intensity detected by the light intensity detector, and thus regulate the cross voltage between two electrodes of the organic light-emitting diode D1 and the change range of the cross voltage, such that different display modes are implemented on the OLED display. For example, a high-contrast mode and a high-luminance mode may be implemented.

Figure 8:
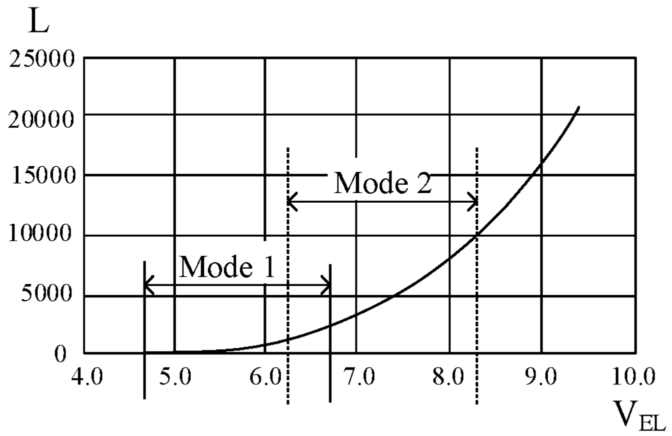
FIG. 8 is a schematic diagram illustrating changes of luminance of a light-emitting device with a cross voltage between two electrodes according to an embodiment of the present disclosure.
Figure 9:
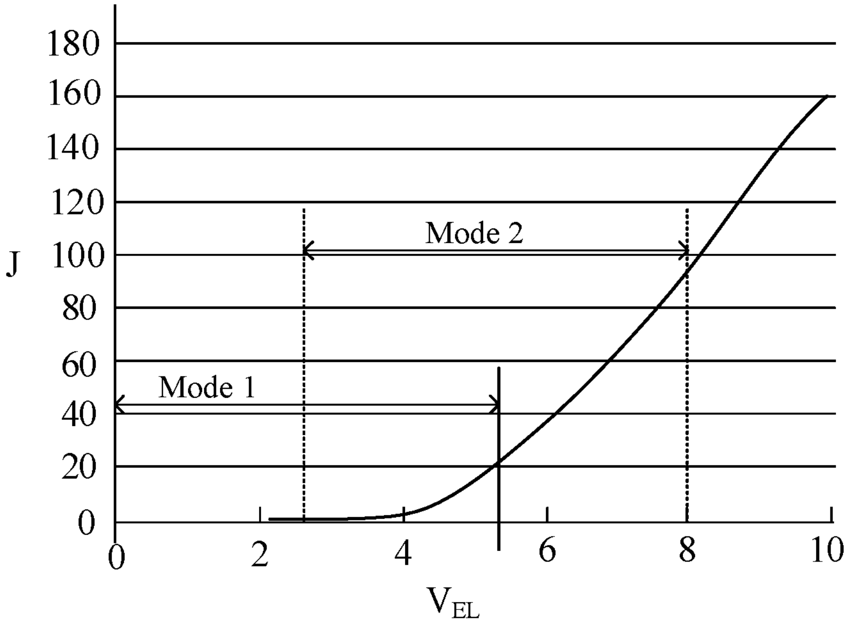
FIG. 9 is a schematic diagram illustrating changes of a current density of the light-emitting device with the cross voltage between two electrodes according to an embodiment of the present disclosure.

FIG. 8 is a schematic diagram illustrating changes of a luminance L of a light-emitting device with a cross voltage VEL between two electrodes thereof according to an embodiment of the present disclosure; and FIG. 9 is a schematic diagram illustrating changes of a current density J of a light-emitting device with the cross voltage VEL between two electrodes thereof according to an embodiment of the present disclosure. The unit of the luminance L is nit, and the unit of the current density J is $mA/cm^2$. As illustrated in FIG. 8 and FIG. 9, mode 1 is the high-contrast mode, and mode 2 is the high-luminance mode. It can be seen with reference to FIG. 8 and FIG. 9 that in the high-contrast mode, the cross voltage VEL between two electrodes of the light-emitting device is low; and in the high-luminance mode, the cross voltage VEL between two electrodes of the light-emitting device is high. For example, in the high-contrast mode, the change range of the cross voltage VEL between two electrodes of the light-emitting device may be from 4.7 V to 6.7 V, or may be from 0 V to 5.2 V. In the high-luminance mode, the change range of the cross voltage VEL between two electrodes of the light-emitting device may be from 6.2 V to 8.2 V, or may be from 2.8 V to 8 V. Therefore, when the high-contrast mode needs to be implemented, the voltage at the power source negative terminal Vss may be regulated to a greater value; and when the high-luminance mode needs to be implemented, the voltage at the power source negative terminal Vss may be regulated to a smaller value.

Exemplarily, assuming that the drive transistor Td employs a 6 V process (that is, a voltage difference between any two electrodes of the drive transistor Td shall not exceed 6 V), and the threshold voltage Vth is 1 V, then due to restrictions of voltage-resistance property of the drive transistor Td, the change range of Vdata is from 1 V to 5 V. If the OLED display is in the high-contrast mode, the contrast is 30000:1, the luminance is 375 nits, and the voltage at the power source negative terminal Vss is −3 V. If the first transistor T1 is not arranged in in the pixel circuit, the cross voltage between two electrodes of the organic light-emitting diode D1 is in the range of 3 V to 7 V. If Vdata is 5 V, Vp=0.2 V; if Vdata is 1 V, Vp=1 V, and then the cross voltage between two electrodes of the organic light-emitting diode D1 may be in the range of 2 V to 6.8 V. Accordingly, the pixel circuit according to the embodiment of the present disclosure may effectively increase the range of the cross voltage between two electrodes of the organic light-emitting diode D1, and hence improve the light-emitting contrast of the organic light-emitting diode D1.

Based on the same inventive concept, an embodiment of the present disclosure provides a display substrate. The display substrate includes a plurality of any pixel circuits as described above. It should be noted that the display substrate may be, for example, an array substrate, an array substrate motherboard, an OLED panel, an OLED panel motherboard and the like. Pixels in the display substrate may all employ the pixel circuit according to the embodiment of the present disclosure, or may partially employ the pixel circuit according to the embodiment of the present disclosure.

In a possible implementation, the display substrate further includes a voltage division control circuit. The voltage division control circuit is connected to each of the pixel circuits via a plurality of control lines. Each control line connects a voltage division control terminal of one pixel circuit to the voltage division control circuit.

Alternatively, each control line may connect the voltage division control terminals of all the pixel circuits in a display unit to the voltage division control circuit, and each pixel circuit is divided to one of a plurality of display units. Each display unit occupies a separate display region. That is, the display substrate may include a plurality of display units, and each display unit may include a plurality of pixel circuits. For example, each display unit may include a column of pixel circuits.

In a possible implementation, the display substrate further includes a gate drive circuit and a data drive circuit.

The gate drive circuit is connected to each of the plurality of pixel circuits via a plurality of gate lines. Each of the plurality of gate lines connects gate signal terminals of a row of pixel circuits to the gate drive circuit.

The data drive circuit is connected to each of the plurality of pixel circuits via a plurality of data lines. Each of the plurality of data lines connects data signal terminals of a column of pixel circuits to the data drive circuit.

Figure 10:
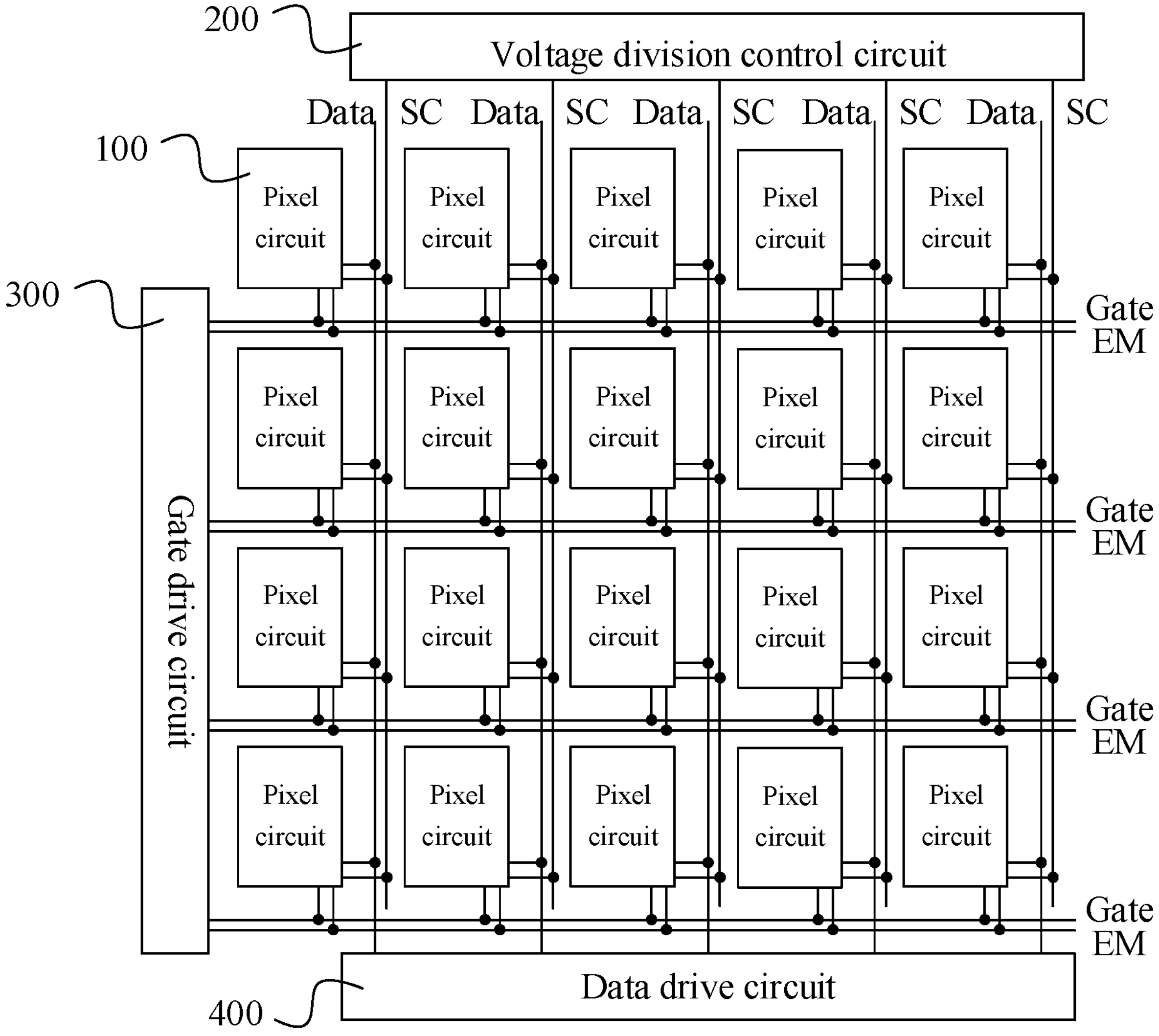
FIG. 10 is a schematic diagram illustrating arrangement of pixel circuits in a display substrate according to an embodiment of the present disclosure.

As an example, FIG. 10 is a schematic diagram illustrating arrangement of pixel circuits in a display substrate according to an embodiment of the present disclosure.

Referring to FIG. 10, a plurality of pixel circuits 100 are arranged to a plurality of row and columns. In addition to the plurality of pixel circuits 100, the display substrate further includes a gate drive circuit 300, a data drive circuit 400 and a voltage division control circuit 200. In FIG. 10, the gate drive circuit 300 is connected to each of the plurality of pixel circuits 100 via a plurality of first gate lines and a plurality of second gate lines. Each of the plurality of first gate lines connects the gate signal terminals Gate of a row of pixel circuits 100 to the gate drive circuit 300, and each of the plurality of second gate lines connects the switch signal terminals EM of a row of pixel circuits 100 to the gate drive circuit 300. The data drive circuit 400 is connected to each pixel circuit 100 via a plurality of data lines. Each of the plurality of data line connects the data signal terminals of a column of pixel circuits 100 to the data drive circuit 400.

In addition, each column of pixel circuits 100 form a display unit, and the voltage division control circuit 200 is connected to each of the plurality of pixel circuits 100 via a plurality of control lines. Each of the plurality of control lines connects the voltage division control terminals SC of all the pixel circuits 100 in a display unit to the voltage division control circuit 200. As such, the gate drive circuit 300 may provide a gate drive signal and a switch control signal for each of the plurality of pixel circuits 100, the data drive circuit 400 may provide a data voltage for updating the drive voltage for each of the plurality of pixel circuits 100, and the voltage division control circuit 200 may provide a voltage division control signal for each of the plurality of pixel circuits 100. In addition, the initialization signal terminal SI of each of the plurality of pixel circuits 100 may be connected to a gate line to which a previous row of pixel circuits is connected, such that a signal at the initialization signal terminal SI desired by another pixel circuit 100 is implemented based on the signal at the first terminal Gate 1 as illustrated in FIG. 5.

In an implementation variation, each control line as illustrated in FIG. 10 may include a sub-line corresponding to each of the plurality of pixel circuits 100, such that each sub-line connects the voltage division control terminal of each of the plurality pixel circuits 100 to the voltage division control circuit 200. As such, the voltage division control circuit 200 may separately perform voltage division control for each of the plurality of pixel circuits 100, which facilitates implementation of a better display effect.

In the embodiment of the present disclosure, the voltage division control circuit 200 may be a circuit arranged independently of the gate drive circuit 300 and the data drive circuit 400, or the voltage division control circuit 200 may be integrated with the data drive circuit 400, or the voltage division control circuit 200 may be integrated in a time sequence controller.

Optionally, the display substrate may include a thin film transistor (TFT) backplane, and a light-emitting device formed on the TFT backplane. The TFT backplane is provided with a plurality of pixel circuits, wherein each pixel circuit is connected to a light-emitting device. The light-emitting device may be an OLED. Alternatively, the display substrate may also be a silicon-based micro OLED substrate. Pixel circuits on the silicon-based micro OLED substrate are all formed on a monocrystalline silicon wafer.

Based on the same inventive concept, an embodiment of the present disclosure provides a display device. The display device includes any of the display substrates as described above. The display device according to the embodiment of the present disclosure may be an OLED display, for example, a display panel, a mobile phone, a tablet computer, a television, a display, a laptop computer, a digital photo frame, a navigator, a wearable device or the like product or part having the display function. The wearable device may be an augmented reality (AR) device or a virtual reality (VR) device or the like.

Figure 11:
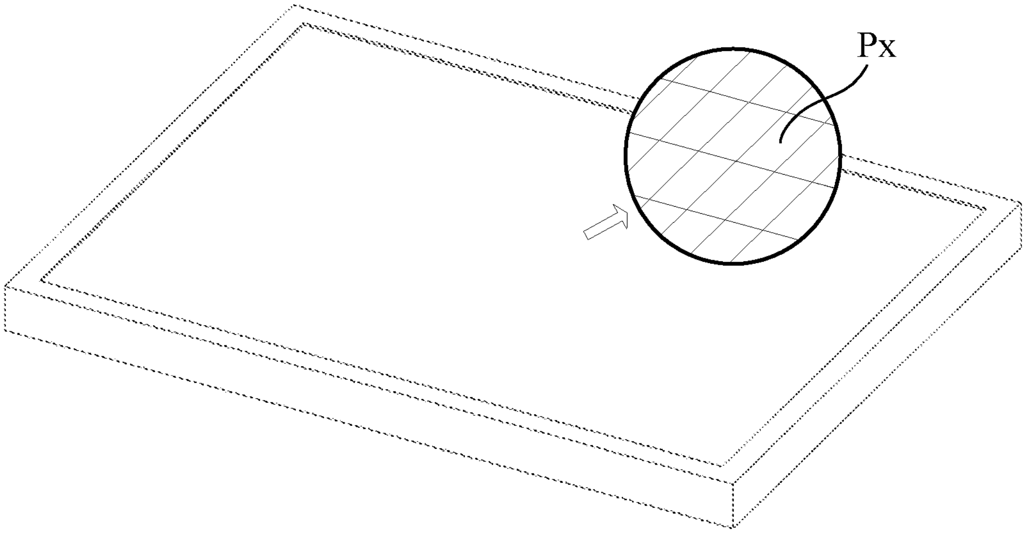
FIG. 11 is a schematic structural diagram of a display device according to an embodiment of the present disclosure.

As an example, FIG. 11 is a schematic structural diagram of a display device according to an embodiment of the present disclosure. Referring to FIG. 11, a display region of the display device includes a plurality of sub-pixel regions Px arranged in rows and columns. Each sub-pixel region Px may be correspondingly provided with any of the pixel circuits as described above, such that the effect of improving the picture contrast may be achieved via the signal at the voltage division control signal terminal SC. In this way, the display device has a better display performance.

Optionally, in the embodiment of the present disclosure, the display device may be further provided with a temperature sensor. The temperature sensor may be configured to detect a temperature of each pixel in the display device. The display device may regulate a gamma curve based on the temperature of the pixels detected by the temperature sensor, such that temperature compensation is implemented.

The foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A display substrate, comprising a plurality of driving circuits, wherein each of the driving circuits comprises a gate signal terminal, a data signal terminal, a switch signal terminal, a light-emitting power source terminal and a voltage division control signal terminal, and further comprises a first sub-circuit, a second sub-circuit and a light-emitting device; the first sub-circuit comprises a first N-type transistor and a first P-type transistor which are connected in parallel, a second transistor, a storage circuit and a drive transistor, and the second sub-circuit comprises a first transistor; wherein a gate of the drive transistor is respectively and directly connected to a first electrode of the first N-type transistor, a first electrode of the first P-type transistor and a first terminal of the storage circuit, a first electrode of the drive transistor is directly connected to a first electrode of the first transistor, and a second electrode of the drive transistor is directly connected to a first electrode of the second transistor;

a gate of the first transistor is directly connected to the voltage division control signal terminal, and a second electrode of the first transistor is directly connected to the light-emitting device;

a second electrode of the second transistor is directly connected to the light-emitting power source terminal, and a gate of the second transistor is directly connected to the switch signal terminal;

a gate of the first N-type transistor is directly connected to a first gate signal terminal, and a gate of the first P-type transistor is directly connected to a second gate signal terminal, and both a second electrode of the first N-type transistor and a second electrode of the first P-type transistor are directly connected to the data signal terminal;

a second terminal of the storage circuit is directly connected to a common voltage line.

2. The display substrate according to claim 1, further comprising a third transistor, wherein a first electrode of the third transistor is directly connected to the first electrode of the drive transistor, and a second electrode of the third transistor is directly connected to the common voltage line.

3. The display substrate according to claim 2, wherein the second electrode of the third transistor is directly connected to a second terminal of the storage circuit.

4. The display substrate according to claim 1, wherein the voltage division control signal terminal is configured to receive a voltage division control signal to control an operation state of the first transistor operating in a linear region.

5. The display substrate according to claim 1, wherein a first electrode of the light-emitting device is directly connected to the second electrode of the first transistor, and a second electrode of the light-emitting device is directly connected to a power source negative terminal.

6. The display substrate according to claim 5, wherein the light-emitting device is an organic light-emitting diode, an anode of the organic light-emitting diode is directly connected to the second electrode of the first transistor, and a cathode of the organic light-emitting diode is directly connected to the power source negative terminal.

7. The display substrate according to claim 1, wherein the voltage division control signal terminal is configured to receive a voltage division control signal switching between at least three different voltage values in each operation cycle, so that an equivalent resistance value between the first electrode and the second electrode of the first transistor is regulated by the voltage division control signal.

8. The display substrate according to claim 7, wherein the at least three voltages comprise a first voltage and a second voltage, the voltage division control signal terminal is configured to receive the first voltage in a first operation cycle, and the voltage division control signal terminal is configured to receive the second voltage in a second operation cycle.

9. The display substrate according to claim 8, wherein both a value of the first voltage and a value of the second voltage are less than a value of a gate high-level voltage.

10. The display substrate according to claim 1, wherein the storage circuit comprises a first capacitor, wherein a first terminal of the first capacitor is directly connected to the gate of the drive transistor, and a second terminal of the first capacitor is directly connected to the common voltage line.

11. A display device, comprising a display substrate according to claim 1.

12. The display device according to claim 11, wherein the display substrate further comprises a third transistor, wherein a first electrode of the third transistor is directly connected to the first electrode of the drive transistor, and a second electrode of the third transistor is directly connected to the common voltage line.

13. The display device according to claim 12, wherein the second electrode of the third transistor is directly connected to a second terminal of the storage circuit.

14. The display device according to claim 11, wherein the voltage division control signal terminal is configured to receive a voltage division control signal to control an operation state of the first transistor operating in a linear region.

15. The display device according to claim 11, wherein a first electrode of the light-emitting device is directly connected to the second electrode of the first transistor, and a second electrode of the light-emitting device is directly connected to a power source negative terminal.

16. The display device according to claim 15, wherein the light-emitting device is an organic light-emitting diode, an anode of the organic light-emitting diode is directly connected to the second electrode of the first transistor, and a cathode of the organic light-emitting diode is directly connected to the power source negative terminal.

17. The display device according to claim 11, wherein the voltage division control signal terminal is configured to receive a voltage division control signal switching between at least three different voltage values in each operation cycle, so that an equivalent resistance value between the first electrode and the second electrode of the first transistor is regulated by the voltage division control signal.

18. The display device according to claim 17, wherein the at least three voltages comprise a first voltage and a second voltage, the voltage division control signal terminal is configured to receive the first voltage in a first operation cycle, and the voltage division control signal terminal is configured to receive the second voltage in a second operation cycle.

19. The display device according to claim 18, wherein both a value of the first voltage and a value of the second voltage are less than a value of a gate high-level voltage.

20. The display device according to claim 11, wherein the storage circuit comprises a first capacitor, wherein a first terminal of the first capacitor is directly connected to the gate of the drive transistor, and a second terminal of the first capacitor is directly connected to the common voltage line.

* * * * *